United States Patent [19]

Matsumoto

[11] Patent Number: 5,745,357
[45] Date of Patent: Apr. 28, 1998

[54] REGULATOR CIRCUIT AND MULTI-OUTPUT SWITCHING POWER UNIT USING THE REGULATOR CIRCUIT

[75] Inventor: Tadahiko Matsumoto, Yokohama, Japan

[73] Assignee: Murata Manufacturing Co., Ltd., Japan

[21] Appl. No.: 661,391

[22] Filed: Jun. 7, 1996

[30] Foreign Application Priority Data

Jun. 8, 1995 [JP] Japan .................. 7-166860
May 20, 1996 [JP] Japan .................. 8-148605

[51] Int. Cl.⁶ .................................................. H02M 7/68
[52] U.S. Cl. .............................. 363/84; 363/86; 323/266
[58] Field of Search ................................ 363/84, 81, 82, 363/86, 56; 323/266, 282, 299

[56] References Cited

U.S. PATENT DOCUMENTS

| | | | |
|---|---|---|---|
| 3,978,393 | 8/1976 | Wisner et al. | 323/17 |
| 4,073,004 | 2/1978 | Chambers et al. | 363/79 |
| 4,675,798 | 6/1987 | Jost et al. | 363/54 |
| 4,754,388 | 6/1988 | Pospisil | 363/54 |
| 5,047,911 | 9/1991 | Sperzel et al. | 363/56 |

Primary Examiner—Adolf Berhane
Attorney, Agent, or Firm—Ostrolenk, Faber, Gerb & Soffen

[57] ABSTRACT

A multi-output switching power unit which can substantially prevent an output power supply of an auxiliary output power circuit from dropping significantly when a load a is light and which has a reduced loss in the output path. A voltage up capacitor 20, a first diode 21, a second diode 22 and a series regulator 13 are provided in the auxiliary output power circuit 9 including a choke rectifier circuit 4. When the load a is light and an output voltage V2 of the auxiliary output power circuit 9 drops to below the predetermined voltage of the series regulator, the series regulator 13 is put into a conductively connected state. Then, an output of an output auxiliary coil 15 flows in the auxiliary output power circuit 9 to an auxiliary choking coil L2 as well as along a route passing through the voltage up capacitor 20, the second diode 22 and the series regulator 13, charges the voltage up capacitor 20, steps up a voltage at the input end side of the auxiliary choking coil L2 and supplies substantially the same voltage to a load b as the voltage before the drop in the output voltage V2 occurred.

6 Claims, 12 Drawing Sheets

REGULATOR CIRCUIT AND MULTI-OUTPUT SWITCHING POWER UNIT USING THE REGULATOR CIRCUIT

BACKGROUND OF THE INVENTION

1. Field of the Invention

The present invention relates to a regulator circuit, and a multi-output switching power unit using the regulator circuit, for use in a personal computer or a facsimile, for example.

2. Description of Related Art

FIG. 15 is a circuit diagram showing the main structure of a conventional forward type multi-output switching power unit. In the figure, the power unit comprises an input circuit 10 having an input power source 5 and a switching element 6, which is a MOS-FET (field effect transistor) in this example, provided in series with an input coil (primary coil) 17 of a transformer 2. A main output power circuit 8 is provided in series with a main output coil (secondary coil) 16 of the transformer 2 and an auxiliary output power circuit 9 is provided in series with an output auxiliary coil (tertiary coil) 15 of the transformer 2, respectively. A pulse width control circuit 11 is connected to the switching element 6 for turning the switching element ON/OFF.

The main output power circuit 8 comprises the main output coil 16, a choke rectifier circuit 3, a filter capacitor C1, a resistor R1 and a resistor R2. A load a is connected at the output side thereof. The choke rectifier circuit 3 comprises a main rectifier diode D1, a main flywheel diode D2 and a main choking coil L1. As shown in the figure, the anode of the main rectifier diode D1 is connected in series with the output of the main output coil 16 and the main choking coil L1 is connected in series with the cathode side of the main rectifier diode D1. The main flywheel diode D2 is connected in parallel with a series circuit of the main output coil 16 and the main rectifier diode D1. The main rectifier diode D1 and the main flywheel diode D2 function as a rectifier circuit for rectifying AC signals input from the primary side of the transformer 2 to the main output coil 16.

When the switching element 6 in the input circuit 10 is ON, the main output coil 16 outputs a voltage derived from the input side coil 17 according to the respective number of turns in each coil, and the choke rectifier circuit 3 rectifies the output of the main output coil 16 via the main rectifier diode D1 and the main choking coil L1. When the switching element 6 is ON, electromagnetic energy caused by the input power is stored in the main choking coil L1 and when the switching element 6 is OFF, the electromagnetic energy in the main choking coil L1 is discharged.

In the main output power circuit 8 having the choke rectifier circuit 3, the main output coil 16 converts the voltage of the input side coil 17 according to the respective number of turns in each coil, when the switching element 6 in the input circuit 10 is ON, and the choke rectifier circuit 3 rectifies the output of the main output coil 16 to supply a main output voltage V1 (main output current I1) to the load a as described above. When the switching element 6 is OFF, the electromagnetic energy stored in the main choking coil L1 when the switching element 6 was ON flows through a path via the load a and the main flywheel diode D2.

The pulse width control circuit 11 applies ON/OFF pulse signals having a constant period T as shown in FIG. 9(a) to the switching element 6 to turn on/off the switching element 6. In order to stabilize the main output voltage V1, the switching element 6 is controlled to turn ON/OFF as described later by detecting a detection voltage Vx based on the main output voltage V1 of the main output power circuit 8 shown in FIG. 15 at a series connection point X of the resistors R1 and R2 and supplying Vx to the control circuit 11 as a detection feedback signal.

That is, when the main output voltage V1 is lower than a predetermined voltage, e.g. 12 V, for example, the main output voltage V1 is stabilized by prolonging a pulse width t of the ON period (by increasing its duty cycle t/T) to compensate for the drop. When the main output voltage V1 is higher than a predetermined voltage, on the other hand, the main output voltage V1 is stabilized by shortening the pulse width of the ON period of the switching element 6 to reduce the duty cycle (t/T) so as to remove the excessive portion of the voltage.

The auxiliary output power circuit 9 has a structure similar to that of the main output power circuit 8. It comprises an output auxiliary coil 15 which derives a voltage from the AC input to the primary side of the transformer 2 according to the respective number of turns in each coil, a choke rectifier circuit 4 having an auxiliary rectifier diode D3, an auxiliary flywheel diode D4, an auxiliary choking coil L2 and a filter capacitor C2. A load b such as a control IC is connected to the output side thereof. The auxiliary rectifier diode D3 and the auxiliary flywheel diode D4 function as a rectifier circuit for rectifying the AC input.

Similarly to the main circuit described above, when the switching element 6 is ON, the output auxiliary coil 15 converts the voltage of the input side coil 17 and the auxiliary output power circuit 9 rectifies the output of the output auxiliary coil 15 via the auxiliary rectifier diode D3 and the auxiliary choking coil L2 of the choke rectifier circuit 4 to supply an almost constant output current I2 (output voltage V2) to the load b. When the switching element 6 is OFF, electromagnetic energy in the auxiliary choking coil L2 flows through a path via the load b and the auxiliary flywheel diode D4.

It is noted that the auxiliary output power circuit 9 on the output side of the transformer 2 is not necessarily the same as the one shown in FIG. 15, and that two or more circuits may be provided as necessary. Further, the circuit structure of the choke rectifier circuit 3 in the main output power circuit 8 is not confined only to the one shown in FIG. 15. For example, it may be constructed as shown in FIG. 17 wherein the cathode of the main rectifier diode D1 is connected in series with the main output coil 16 and the main choking coil L1 is connected in series with the anode side of the main rectifier diode D1, and the main flywheel diode D2 is connected in parallel with the series circuit of the main output coil 16 and the main rectifier diode D1 by connecting the anode of the main flywheel diode D2 to the main choking coil L1.

As described above, the detection voltage Vx of the main output power circuit 8 is fed back to control the ON/OFF switching of the switching element 6 in the input circuit 10 and the auxiliary output power circuit 9 is cross-regulated by the ON/OFF operation of the switching element 6 in the circuit shown in FIG. 15.

In operation, when the resistance of the load a connected to the main output power circuit 8 increases and the load a thereby provides only a light load, the main output voltage V1 increases. Then, in order to stabilize the main output voltage V1, the ON pulse width of the switching element 6 is shortened as shown in FIG. 9(a) to reduce the duty cycle (t/T). Because the auxiliary output power circuit 9 is cross-regulated as described above, under the condition that a constant current flows there, its output voltage V2 drops.

FIG. 10 is a graph showing a relationship between the output voltage V2 of the auxiliary output power circuit 9 and the main output current I1 of the main output power circuit 8. When the main output current I1 drops below a cut-off current value at which the choke current of the choke rectifier circuit 3 is cut off, a choke current of the main choking coil L1 becomes discontinuous as shown in FIG. 9(c) and due to the cross-regulation, a problem occurs, namely that the output voltage V2 of the auxiliary output power circuit 9 drops sharply as indicated by a solid line A in FIG. 10.

In order to solve the aforementioned problem, there has been proposed a circuit as shown in FIG. 16 in which a series regulator 13 is provided on the output side of the choke rectifier circuit 4 of the auxiliary output power circuit 9 to prevent the drop of the output voltage V2 when the main output power circuit 8 is lightly-loaded. However, this circuit has had a problem that although it is practically possible to avoid the problem of the drop of the output voltage V2 when the load is light by providing the series regulator 13, voltage loss in the series regulator 13 is great because the voltage is output via the series regulator 13 at all times, including when the load is light, and the voltage loss becomes very large especially when the main output current I1 of the main output power circuit 8 is more than the value of the cut-off current, as indicated by a solid line C in FIG. 11.

SUMMARY OF THE INVENTION

Accordingly, it is an object of the present invention to solve the aforementioned problems by providing a regulator circuit (which may be in an auxiliary output power circuit), and a multi-output switching power unit using the regulator circuit, in which an output voltage thereof will not drop even when the load is light and which causes less loss on an output path thereof.

In order to achieve the aforementioned object, the present invention can solve the aforementioned problems as follows. That is, in a first embodiment of a regulator circuit comprising an inverter section for inputting AC; a rectifier circuit, connected in parallel with the inverter section, for rectifying the AC signal input to the inverter section; and a choking coil connected in series with the output side of the rectifier circuit, a series circuit of a first diode and a voltage up capacitor is connected at the output side of the rectifier circuit in parallel with the rectifier circuit by connecting the voltage up capacitor to the input side of the choking coil and a series regulator is connected between a series connection point of the first diode and the voltage up capacitor and the output side of the choking coil.

A second embodiment of a regulator circuit can solve the aforementioned problem by providing a second diode for blocking a backward current which is connected in series with the series regulator, in addition to the structure of the first embodiment of a regulator circuit described above.

A third embodiment of a regulator circuit can solve the aforementioned problem by connecting the series regulator circuit in the first embodiment of the regulator circuit described above in series with the first diode, connecting the voltage up capacitor in series with the series circuit of the series regulator and the first diode, and connecting the second diode between the series connection point of the voltage up capacitor and the output side of the choking coil.

Further, a first embodiment of an inventive multi-output switching power unit can solve the aforementioned problem, comprising an input power supply and a switching element for controlling a secondary output of a transformer, provided at the input side of the transformer; a main rectifier circuit connected in parallel with a main output coil of the transformer; a main choking coil connected in series at the output side of the main rectifier circuit, thus forming a main output power circuit at the secondary side of the transformer; an output auxiliary coil which is different from the main output coil and provided at the output side of the transformer; and any one of the embodiments of a regulator circuit described above, having the output auxiliary coil as an inverter section thereof.

In the inventive regulator, when the output voltage is no less than the predetermined voltage of the series regulator, the series regulator is turned completely off and the AC input signal in the inverter section is output to the load via the rectifier circuit and the choking coil. When the output voltage is less than the predetermined voltage of the series regulator, the series regulator is conductively connected. Then, while part of the input rectified by the rectifier circuit passes through the choking coil, the other part of the input is supplied to the output side of the choking coil via the voltage up capacitor and the series regulator, is combined with the output which has passed through the choking coil and is supplied to the load. In this operation, because part of the output (current) from the rectifier circuit passes through the voltage up capacitor, the voltage up capacitor is charged and a voltage at the input side of the choking coil is stepped up. Then, an amount of the current flowing through the choking coil increases, an amount of the current flowing through the series regulator decreases and a voltage of the series regulator is divided by the voltage up capacitor, thus dropping the voltage applied to the series regulator. The effects of increasing the current through the choking coil and of dividing the voltage applied to the series regulator caused by the voltage up capacitor, reduce the drop of the output voltage, stabilize the output voltage and maintain a low loss circuit operation, and the loss of the series regulator is reduced.

Further, in the inventive multi-output switching power unit described above, the transformer converts and outputs the input side (primary) coil voltage when the switching element provided at the input side of the transformer is ON. The main output power circuit outputs the output of the main output coil of the transformer when the switching element is ON as a main output voltage via the main rectifier circuit and the main choking coil. The main output voltage is detected and a detection feedback signal is fed back to stabilize the main output voltage by controlling the ON/OFF switching of the switching element by prolonging its ON pulse width (by increasing the duty cycle), when the main output voltage drops, for example, so as to compensate for the drop.

The regulator circuit which functions as the auxiliary output power circuit normally outputs all of the output of the output auxiliary coil of the transformer when the switching element is ON via the rectifier circuit and the choking coil. However, when the load connected to the main output power circuit is light and the output voltage of the auxiliary output power circuit drops to less than the predetermined voltage of the series regulator (as the ON pulse width of the switching element is shortened to stabilize the main output), the series regulator becomes conductively connected and the output of the output auxiliary coil flows through the choking coil as well as the route passing through the voltage up capacitor by being diverted just before the choking coil.

At this time, the voltage up capacitor is charged, as it is fed with the output of the output auxiliary coil, and acts like a power supply. It steps up the voltage at the input side of the choking coil, increases the choke current, and prevents the voltage at the output side of the choking coil, i.e. the output voltage of the auxiliary output power circuit, from dropping to less than the predetermined voltage of the series regulator. Namely, whether the series regulator should be operated or not, in the regulator circuit functioning as an auxiliary output power circuit, is not determined by the duty cycle of the input signal in the inverter, but by the fact whether the output voltage of the auxiliary output voltage circuit drops to less than the predetermined voltage of the series regulator.

The above and other related objects and features of the present invention will be apparent from a reading of the following description of the disclosure found in the accompanying drawings and the novelty thereof pointed out in the appended claims.

DESCRIPTION OF PREFERRED EMBODIMENTS

Figure 1:
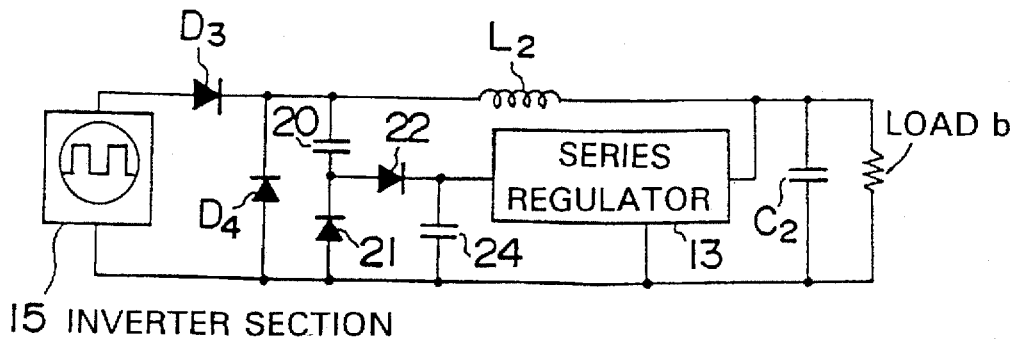
FIG. 1 is a circuit diagram showing a first preferred embodiment of a regulator circuit according to the present invention.

Preferred embodiments of the present invention will be explained below with reference to the drawings. It is noted that in the descriptions of the embodiments which follow, functional parts that are the same as those in the prior art are labeled with the same reference numerals and an overlapping explanation thereof will be omitted.

Figure 6A:
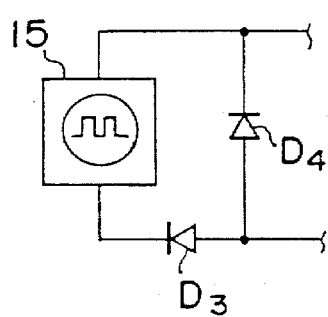
FIGS. 6(a) and 6(b) are explanatory circuit diagrams showing other structural examples of a rectifier circuit provided at the output side of an inverter section.
Figure 6B:
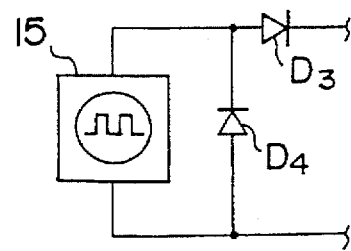

FIG. 1 shows the main structure of a regulator circuit according to the first embodiment of the invention. In the figure, a rectifier circuit composed of a rectifier diode D3 and a flywheel diode D4 is connected in parallel with an inverter section 15, i.e. an AC input section. Although the rectifier circuit shown in FIG. 1 is formed as a common cathode type circuit in which the cathode sides of the rectifier diode D3 and the flywheel diode D4 are connected each other, the rectifier circuit may also be a common anode type circuit as shown in FIG. 6(a) or a type of rectifier circuit in which the cathode side of the flywheel diode D4 is connected to the anode side of the rectifier diode D3 as shown in FIG. 6(b). That is, the rectifier circuit for rectifying the input signal of the inverter section 15 is not confined only to the circuit shown in FIG. 1, and it may have various other modes.

A choking coil L2 is connected in series with the output of the rectifier circuit at the connection point between the diodes D3 and D4. Further, a series circuit composed of a first diode 21 and a voltage up capacitor 20 in which the voltage up capacitor 20 is connected to the cathode side of the first diode 21 is connected to the output side of the rectifier circuit in parallel with the flywheel diode D4, by connecting the voltage up capacitor to the input side of the choking coil.

The anode side of a second diode 22 is connected to a series connection point of the first diode 21 and the voltage up capacitor 20, the input side of a series regulator 13 is connected to the cathode side of the second diode 22, and the output side of the series regulator 13 is connected to the output of the choking coil.

Further, a capacitor 24 for turning a current flowing in the series regulator 13 into DC is connected between the cathode side of the second diode 22 and the anode side of the first diode 21. This capacitor 24 reduces the RMS current value by smoothing the input current Irms of the series regulator. Since the power loss P of the series regulator is defined by $P=(Irms)^2 R$, the capacitor 24 thereby has the function of reducing the loss of the series regulator. A filter capacitor C2 is connected between the output side of the choking coil L2 and the anode of the flywheel diode D4 and a load b is connected in parallel with the filter capacitor C2.

Figure 2A:
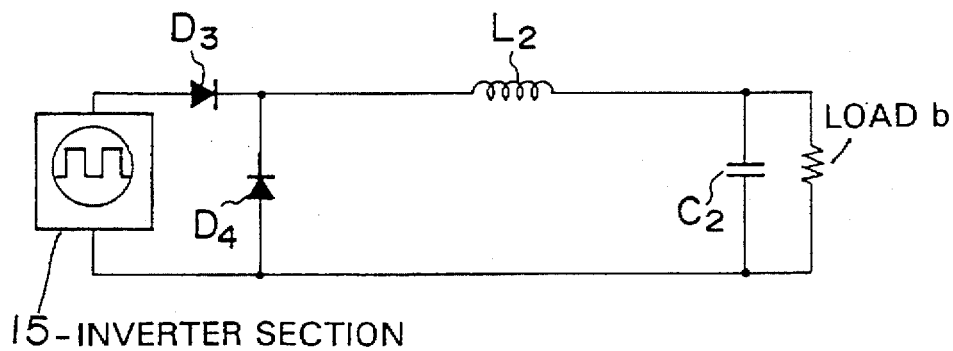
FIGS. 2(a) and 2(b) are explanatory diagrams for explaining rectifier circuits, referred to as type A and type B.
Figure 2B:
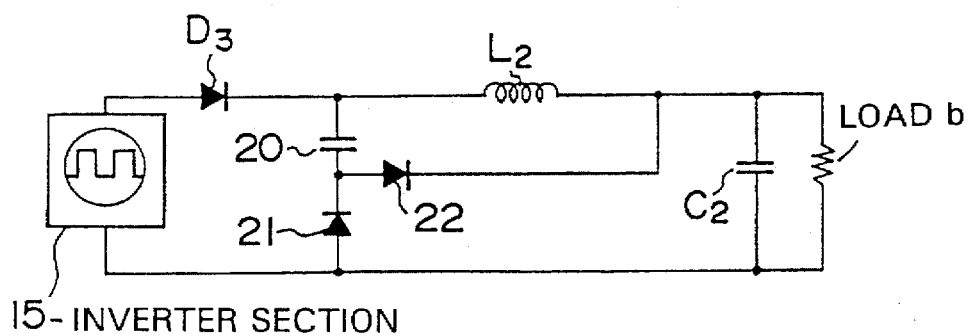

The regulator circuit shown in FIG. 1 has a circuit structure which is a combination of a rectifier circuit which will be referred to as "type A," shown in FIG. 2(a), and a rectifier circuit which will be referred to as "type B" shown in FIG. 2(b), and further including the series regulator 13 and the capacitor 24. When an output voltage of the type B rectifier circuit shown in FIG. 2(b) is greater than that of the type A rectifier circuit shown in FIG. 2(a), the regulator circuit of the present embodiment stabilizes the output voltage by outputting an intermediate voltage between those of the type A and type B rectifier circuits by controlling the series regulator 13. In the regulator of the present embodiment, the greater the difference of the output voltages between the type A and type B rectifier circuits, the wider a control range is.

Figure 3A:
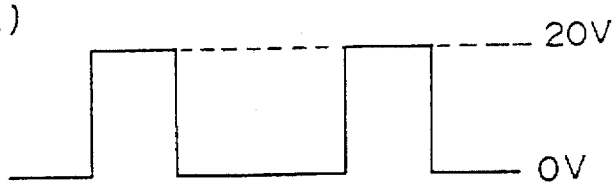
FIG. 3(a) is a graph showing AC input waveforms of the type A and type B rectifier circuits shown in FIG. 2.
Figure 3B:
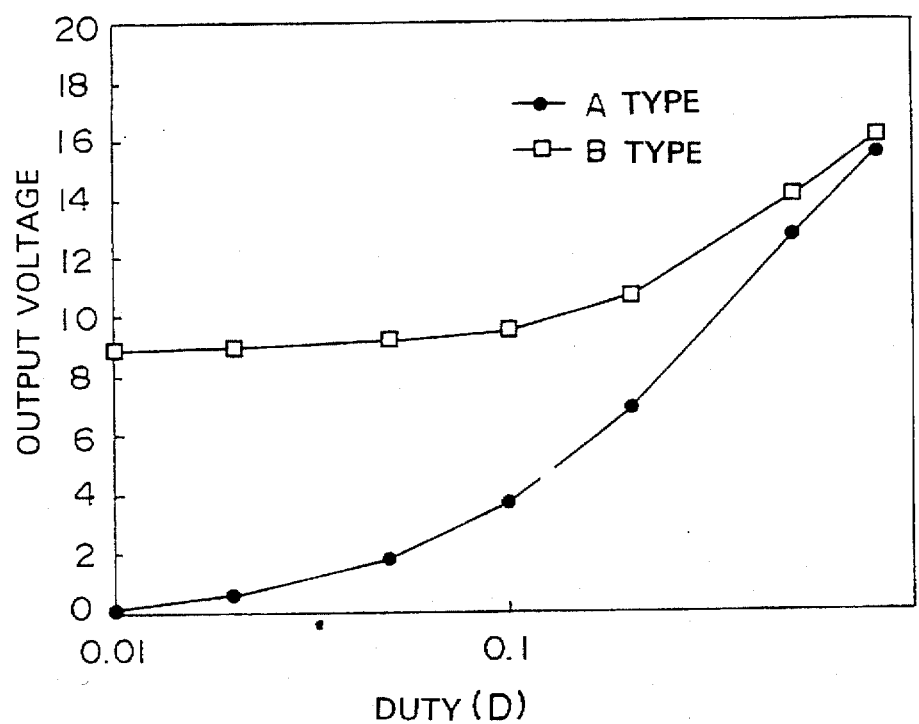
FIG. 3(b) is a graph showing a relationship between output voltages and duty cycles of the input waveforms.

FIG. 3(b) is a graph showing changes in output voltages when an AC input with a rectangular circuit wave form as shown in FIG. 3(a) is applied to the type A and type B rectifier circuits and its duty cycle is changed. As can be seen from the graph, when the duty cycle of the AC input is small, the difference of the output voltages of the type A and type B rectifier circuits is great. Because the regulator circuit of the present embodiment is the type which outputs an intermediate voltage between those of the type A and type B rectifier circuits, the control width of the regulator circuit of the present embodiment becomes large in the range where the duty is small. The regulator circuit of the present embodiment having such a property is effective especially in a multi-output DC-DC converter using choke input rectification for example to suppress a drop of voltage of a cross-regulated auxiliary output (output other than a main output) when the main output among the multiple outputs is turned into a choke current continuous mode.

In the regulator circuit of the present embodiment shown in FIG. 1, when the voltage becomes larger than the predetermined voltage of the series regulator, the series regulator 13 is in an OFF state completely and the current from the inverter section 15, rectified by the rectifier circuit, is all supplied to the load b via the path on the auxiliary choking coil L2 side. That is, the output voltage is supplied to the load b stably and thus no loss would be generated by the series regulator.

On the other hand, if the output voltage drops to less than a preset voltage of the series regulator 13, the series regulator 13 is conductively connected and the current rectified by the rectifier circuit composed of the rectifier diode D3 and the flywheel diode D4 is divided between the auxiliary choking coil L2 and the voltage up capacitor 20. The current flowing through the voltage up capacitor 20 passes through the second diode 22 and the series regulator 13, is combined with the current from the auxiliary choking coil L2, and is supplied to the load b. In the present embodiment, because the current flows through the voltage up capacitor 20, the voltage up capacitor 20 is charged and functions like a battery, thus stepping up the voltage at the input side of the auxiliary choking coil L2. Due to this voltage step-up effect, the current flowing through the auxiliary choking coil L2 is increased and flows in a continuous mode therethrough. That is, the power is prevented from being fed in a discontinuous mode. The output voltage is thereby suppressed from dropping and thus the voltage is supplied stably to the load b.

It is noted that although the series regulator 13 causes a loss because the series regulator 13 is fed with the current, the current flowing through the auxiliary choking coil L2 is increased and the current flowing through the series regulator 13 is reduced by the same amount, by providing the voltage up capacitor 20 to step up the voltage at the input side of the auxiliary choking coil L2. The voltage applied to the series regulator 13 is also reduced by being divided by the voltage up capacitor 20 in the present embodiment. Accordingly, due to the current separating effect and the voltage dividing effect of the voltage up capacitor 20, the loss caused by the series regulator 13 is very small and the output voltage may thereby be supplied stably with less circuit loss even in the range wherein the duty cycle of the AC input of the inverter section is small.

It is noted that when the AC input to the inverter section 15 is OFF, electromagnetic energy stored in the auxiliary choking coil L2 due to the power that was fed when the input was ON flows through a path along the load b, the first diode 21 and the voltage up capacitor 20, and the electric charge in the voltage up capacitor 20 is discharged to be ready for input of the next ON signal from the inverter section 15.

Figure 4:
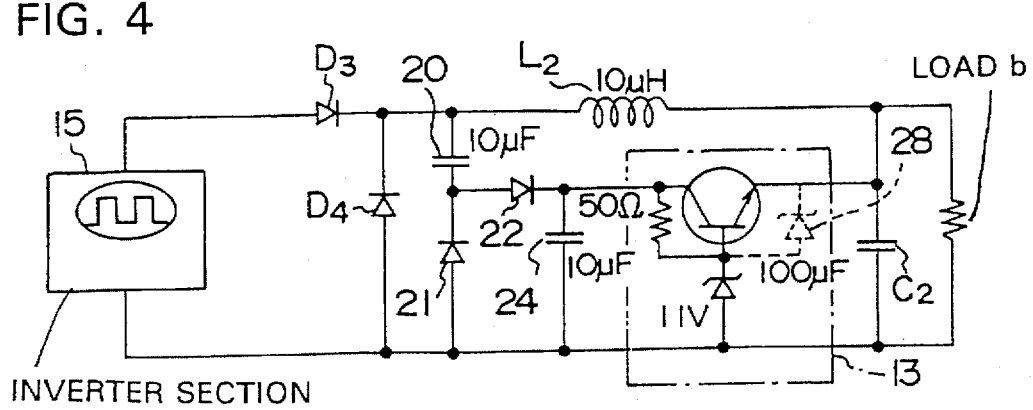
FIG. 4 is a schematic diagram showing a circuit in which a load current characteristic of the first embodiment of a regulator circuit was measured.
Figure 5A:
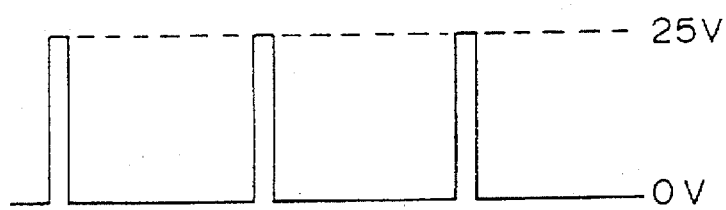
FIGS. 5(a) and 5(b) are explanatory diagrams showing a relationship between the load current characteristic measured in the circuit shown in FIG. 4 and the AC input waveform at that time.
Figure 5B:
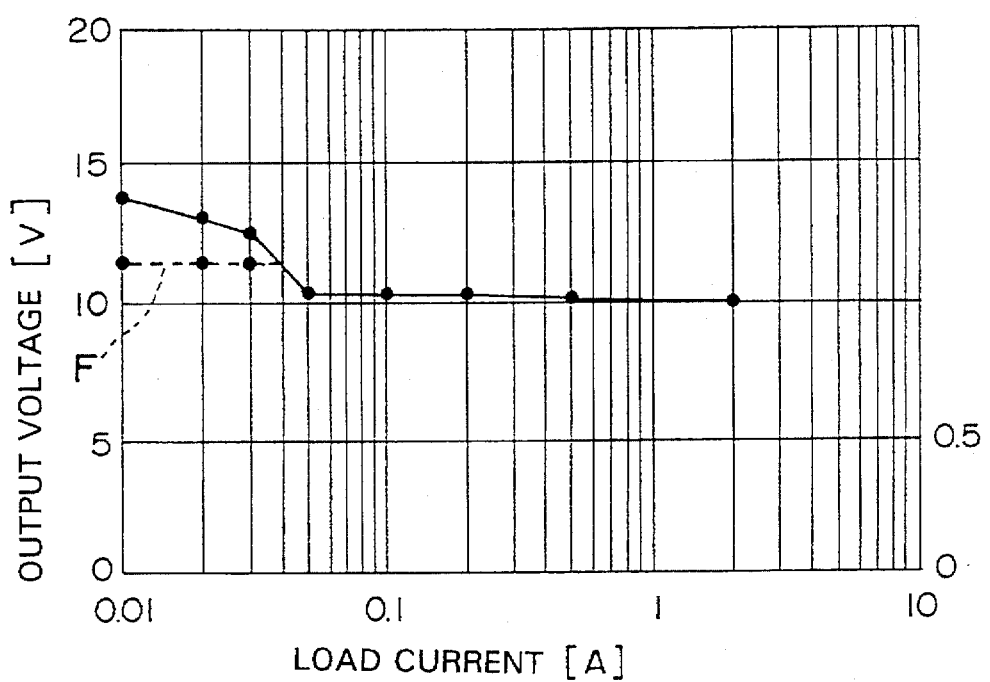

FIG. 5(b) is a graph showing one example of a load current characteristic of the regulator circuit of the present embodiment when an AC waveform as shown in FIG. 5(a) is applied as an AC input. This load current characteristic was measured by using a concrete circuit as shown in FIG. 4 and the measurement result obtained with the duty cycle of the AC input set at 0.1 is shown as a typical example. The resultant characteristic clearly shows that an almost constant output voltage is obtained over a range of load current of more than about 0.05 A in the regulator circuit of the present embodiment and is proof that it can supply the output voltage stably.

While the output voltage increases in a range where the load current is less than 0.05 A in the graph of FIG. 5(b), this is considered to happen because the current flowing through the auxiliary choking coil L2 becomes discontinuous since the load current is too small. This discontinuous power-on state may be eliminated by providing a Zener diode 28 between a base and a collector of a transistor within the series regulator 13 as indicated by a chain line in FIG. 4. As indicated by a chain line F in FIG. 5(b), it was proven that the output voltage may be controlled almost to a constant voltage, though it increases slightly in the range where the load current is small, by providing the Zener diode 28.

While the load current characteristic shown in FIG. 5(b) with the 0.1 duty cycle of the AC input has been shown as a typical example, it was also confirmed that even when the duty cycle of the AC input of the inverter section 15 is not 0.1, the circuit of the present embodiment has the excellent characteristic that it can supply a low loss constant voltage over a wide range, from the range where the load current is small to the range where it is large.

It is noted that when the electromagnetic energy in the auxiliary choking coil L2 flows from the first diode 21 to the voltage up capacitor 20 during a flywheel period when the AC signal to the inverter section 15 is OFF, a polarity of the voltage up capacitor 20 caused by the charge is a polarity in the direction of the flow of the current, so that a decrease of the current caused by the flow thereof during the flywheel period becomes less, and a loss due to the circuit operation during the flywheel period can be reduced as well.

Figure 7:
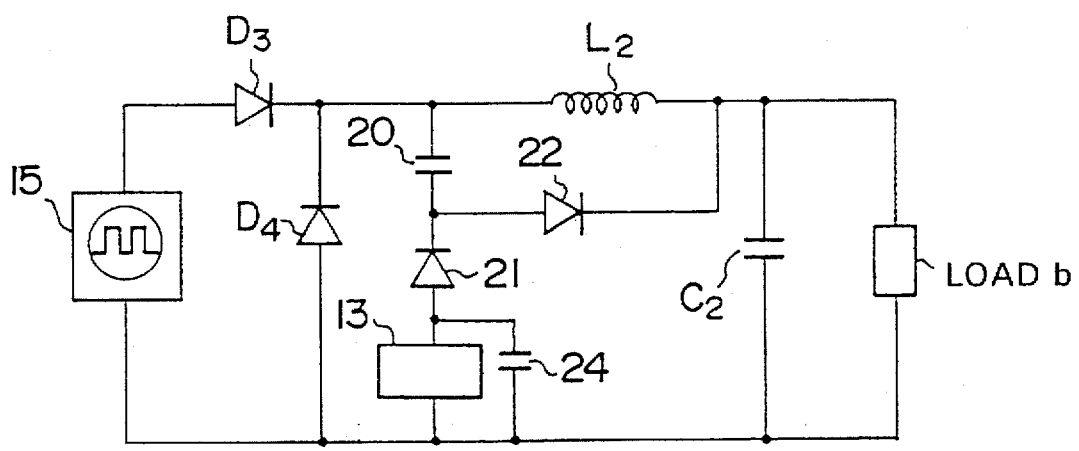
FIG. 7 is a circuit diagram showing a second embodiment of a regulator circuit according to the present invention.

FIG. 7 shows a regulator circuit according to a second embodiment of the present invention. The circuit regulator of the present embodiment differs from the circuit of the first embodiment described above in that the series regulator 13 is connected to the anode side of the first diode 21 in series (or it may be connected to the cathode side of the first diode 21 in series). Also, the second diode 22 is connected between a series connection point of the cathode side of the first diode 21 and the voltage up capacitor 20, and the output side of the auxiliary choking coil L2, with the cathode side of the second diode 22 being connected to the output side of the auxiliary choking coil L2. Other than that, the structure is the same as the circuit of the first embodiment.

In the regulator circuit of the second embodiment, an input current from the inverter section 15 is all output via the auxiliary choking coil L2 when the output voltage is not less than the predetermined voltage of the series regulator. However, the input current is divided between a current flowing through the auxiliary choking coil L2 and a current flowing through the voltage up capacitor 20, and the series regulator is conductively connected, when the output voltage becomes less than the predetermined voltage of the series regulator. The current flowing through the voltage up capacitor 20 passes through the second diode 22, is combined with the current flowing through the auxiliary choking coil L2, and is supplied to the load b.

At this time, the voltage up capacitor 20 functions as a battery similarly to the one in the first embodiment. It steps up a voltage at the input side of the auxiliary choking coil L2 and increases the current flowing through the auxiliary choking coil L2. Then, the current flows in the continuous mode and the output voltage is supplied stably. However, when the AC input of the inverter section 15 is OFF, the electromagnetic energy stored in the choking coil L2 flows via a route through the load b, the series regulator 13, the first diode 21, and the voltage up capacitor 20, and the charge stored in the voltage up capacitor 20 is discharged.

It is noted that the series regulator 13 remains in the OFF state when the output voltage is larger than the predetermined voltage of the series regulator. Due to that, because no current flows to the voltage up capacitor 20 from the series regulator 13 during the flywheel period, no charge is discharged from the voltage up capacitor 20. Then, when the AC input is ON, the current from the inverter section 15 is not diverted to the voltage up capacitor 20 and flows entirely via the auxiliary choking coil L2, and thus no loss would be generated by the series regulator.

The regulator of the second embodiment can also supply the output voltage stably with the low loss circuit operation similarly to the regulator of the first embodiment.

Figure 8:
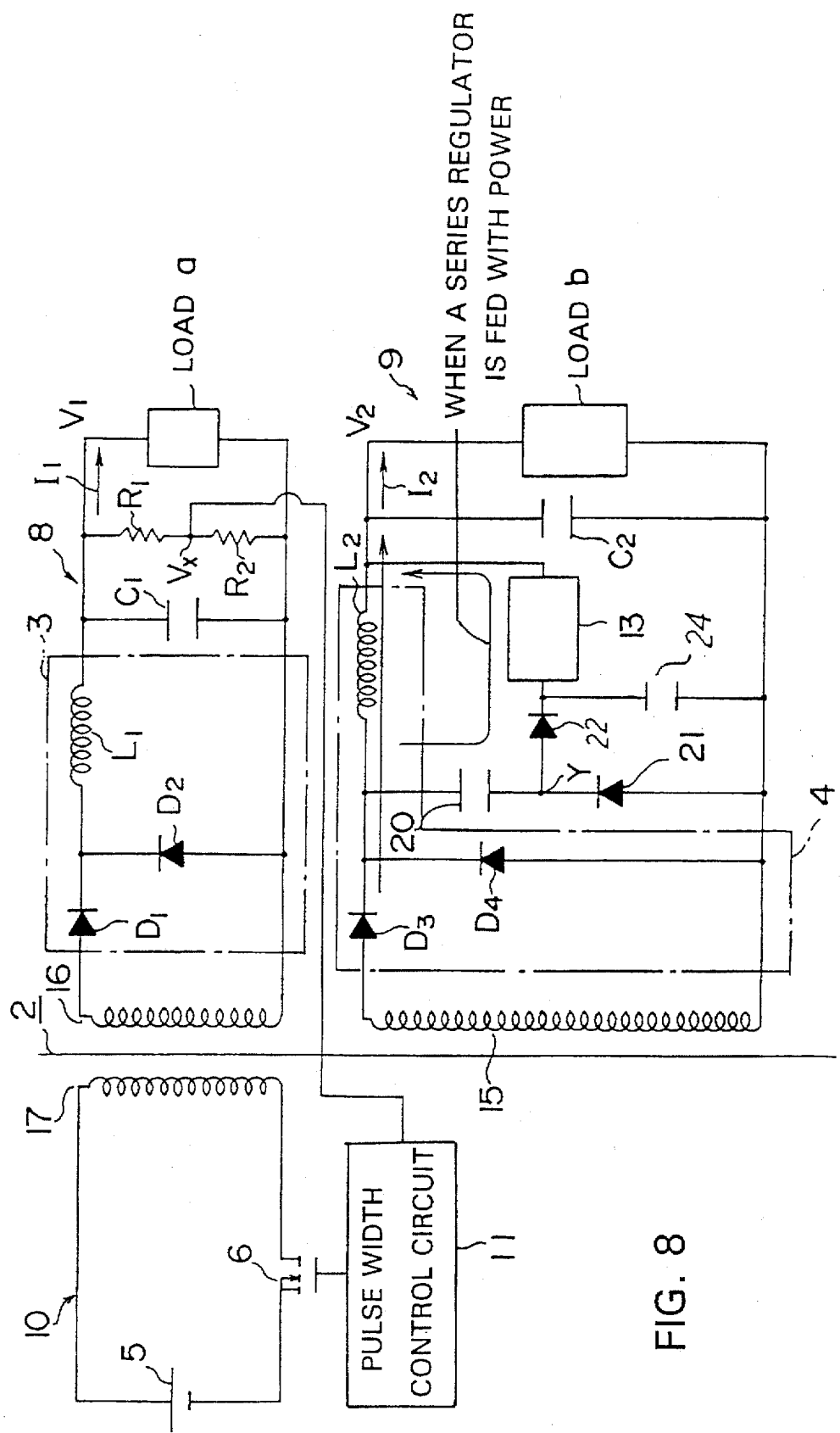
FIG. 8 is a circuit diagram showing a main structure of a first embodiment of a multi-output switching power unit according to the invention.
Figure 15:
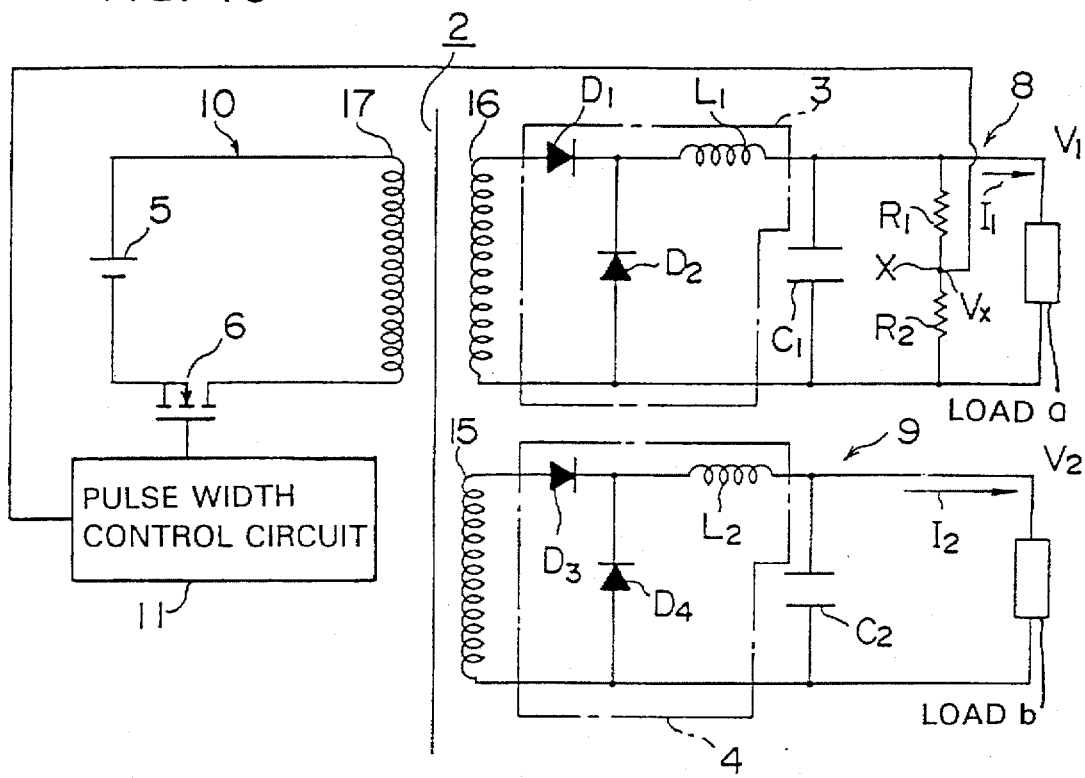
FIG. 15 is a circuit diagram showing a prior art multi-output switching power unit.
Figure 16:
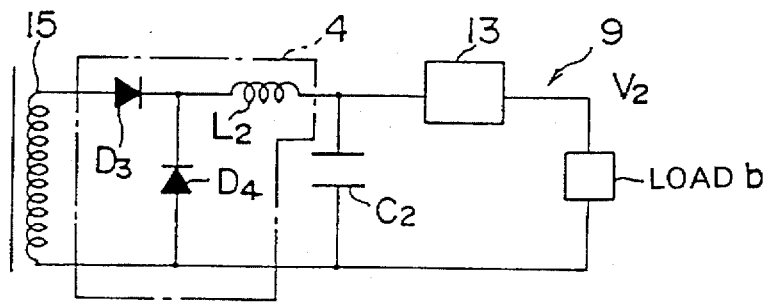
FIG. 16 is a circuit diagram showing a prior art auxiliary output power circuit equipped with a series regulator.

FIG. 8 shows the main structure of a first embodiment of an inventive multi-output switching power unit. Similarly to the prior art example shown in FIG. 15, an auxiliary output power circuit 9 in the present embodiment has a choke rectifier circuit 4, an output auxiliary coil 15 and a filter capacitor C2. Specifically, it comprises the voltage up capacitor 20, the first diode 21, the second diode 22 and the series regulator 13 and is constructed so as to avoid a large drop of an output voltage V2 of the auxiliary output power circuit 9 when the load a connected to a main output power circuit 8 is light. The auxiliary output power circuit 9 is constructed by using the regulator circuit in FIG. 1 described above. The inverter section 15 in FIG. 1 corresponds to the output auxiliary coil 15. It is noted that the circuit structure of the main output power circuit 8 is the same as in the prior art example shown in FIG. 15.

As shown in FIG. 8, the voltage up capacitor 20 is connected in series with the cathode side of the first diode 21 in series and this series circuit is connected in parallel with the flywheel diode D4. The voltage up capacitor 20 is connected to the input side of the auxiliary choking coil L2. The anode side of the second diode 22 is connected to the series connection point Y of the voltage up capacitor 20 and the first diode 21, and the series regulator 13 is provided between the cathode side of the second diode 22 and the output side of the auxiliary choking coil L2. The capacitor 24 for converting the current flowing in the series regulator 13 to a direct current is connected between the cathode side of the second diode 22 and in the anode side of the first diode 21.

The series regulator 13 is arranged so that the output voltage of the auxiliary output power circuit 9 is diverted to the series regulator 13 side when the load a of the main output power circuit 8 is light, the ON pulse width of the switching element 6 is shortened and the output voltage V2 of the auxiliary output power circuit 9 drops below a preset reference voltage.

When the series regulator 13 is in a power-on state, and when the output of the output auxiliary coil 15 passes through the auxiliary choking coil L2, the output of the coil 15 is also diverted just before the auxiliary choking coil L2 and is output via the voltage up capacitor 20, the second diode 22 and the series regulator 13. As the output is fed to the load b, the voltage up capacitor 20 is charged and acts like a battery (cell), stepping up the voltage at the input side of the auxiliary choking coil L2. Thereby, the capacitor 20 increases the choke current of the auxiliary choking coil L2 by suppressing the flywheel time of the choke current, thus keeping the output voltage of the auxiliary choking coil L2, i.e. the output voltage V2 of the auxiliary output power circuit 9, from dropping.

When the switching element 6 is OFF, the electromagnetic energy in the auxiliary choking coil L2 flows along a route via the load b, the first diode 21 and the voltage up capacitor 20. At this time, the charge in the voltage up capacitor 20 is discharged, to be ready to charge again the next time the switching element 6 is turned on.

When the load a of the main output power circuit 8 is not light, i.e. when the series regulator 13 is in a power-off state, all the output of the output auxiliary coil 15 is output along a route via the auxiliary rectifier diode D3 and the auxiliary choking coil L2.

Figure 11:
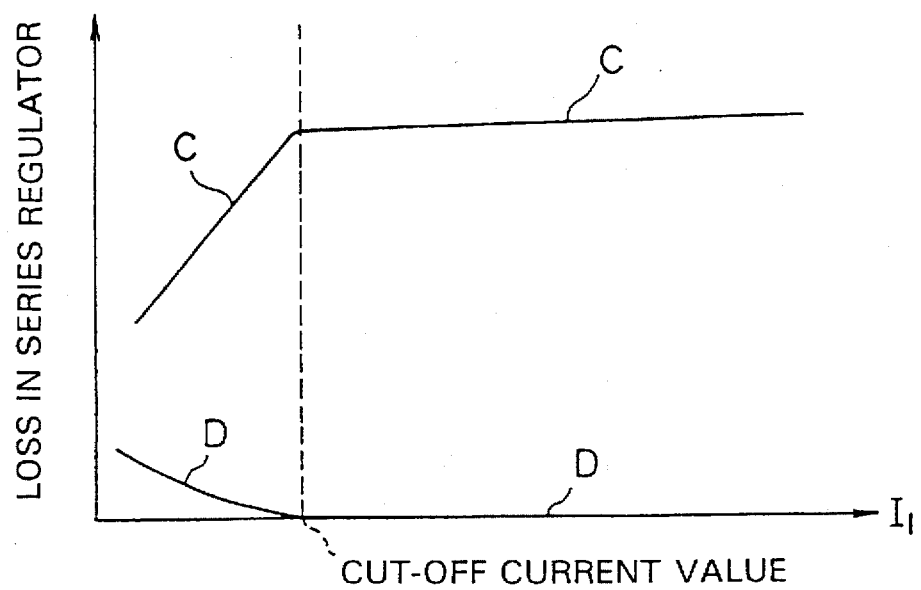
FIG. 11 is a graph showing a relationship between the output current of the main output power circuit and a loss in the series regulator.

As described above, when the series regulator 13 is in the power-off state, i.e. when a main output current I1 of the main output power circuit 8 exceeds the cut-off current value, no output current flows through the series regulator 13, so that there is no power loss in the series regulator 13 as indicated by a solid line D in FIG. 11. Further, when the main output current I1 of the main output power circuit 8 drops below the cut-off current value and the series regulator 13 is put into the power-on state, the output current is divided between the auxiliary choking coil L2 and the series regulator 13, and the voltage of the series regulator is divided by the voltage up capacitor 20, so that the power loss in the series regulator 13 is small as indicated by the solid line D in FIG. 11 as compared to a case indicated by a solid line C when all the output current flows through the series regulator 13.

Figure 10:
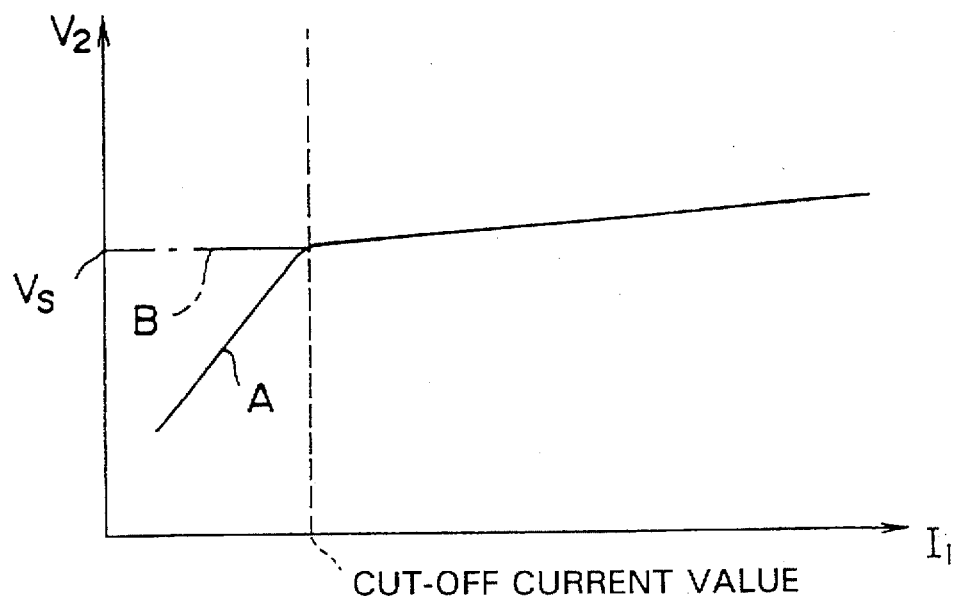
FIG. 10 is a graph showing a relationship between an output current of a main output power circuit and an output voltage of an auxiliary output power circuit.

The circuit operation of the auxiliary output power circuit 9 will be explained briefly below. When the main output current I1 of the main output power circuit 8 is greater than the cut-off current value and the output voltage V2 of the auxiliary output power circuit 9 is output substantially stably above the preset reference voltage as shown in FIG. 10, the series regulator 13 in the auxiliary output power circuit 9 shown in FIG. 8 is kept in the power-off state. When the series regulator 13 is in the power-off state, the auxiliary output power circuit 9 rectifies the output of the output auxiliary coil 15 via the rectifier diode D3 and the auxiliary choking coil L2 in the choke rectifier circuit 4 and supplies a substantially constant output current I2 to the load b when the switching element 6 in the input circuit 10 is ON. When the switching element 6 is OFF, the electromagnetic energy stored in the auxiliary choking coil L2 flows along the route via the load b and the flywheel diode D4.

Figure 9A:
FIG. 9 is a time chart showing operating waveforms (a)–(f) of main structural elements in the embodiment shown in FIG. 8.
Figure 9B:
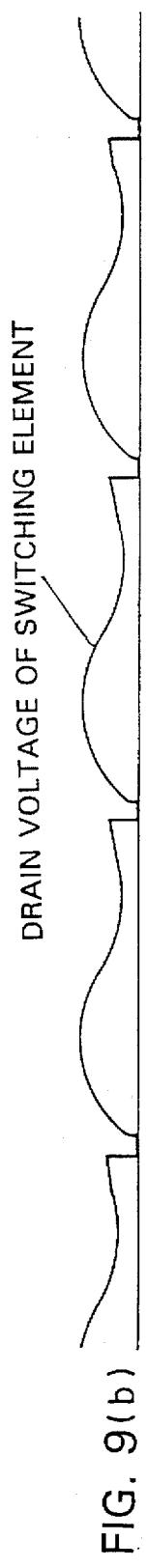
Figure 9C:
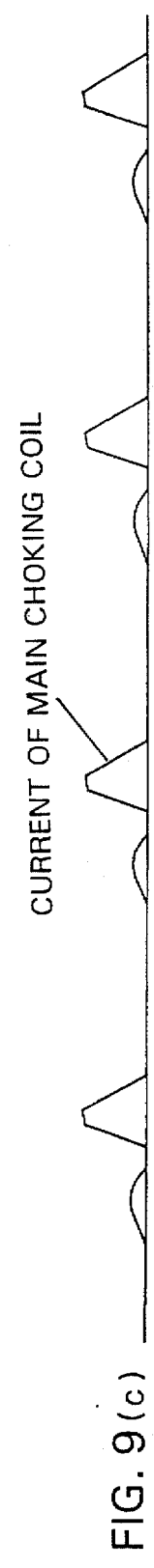
Figure 9D:
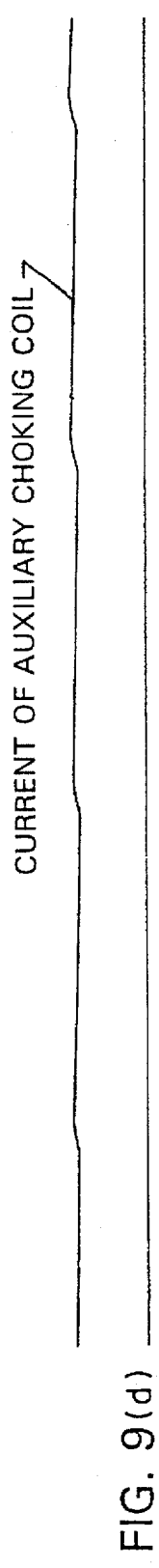
Figure 9E:
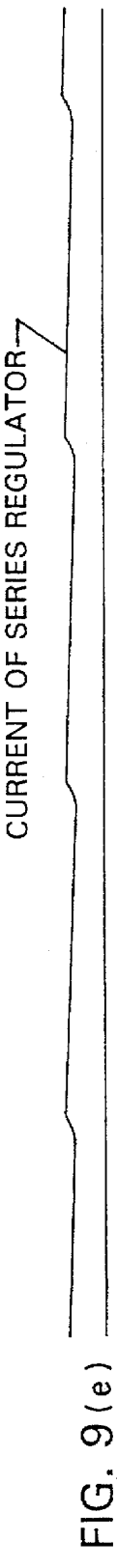
Figure 9F:
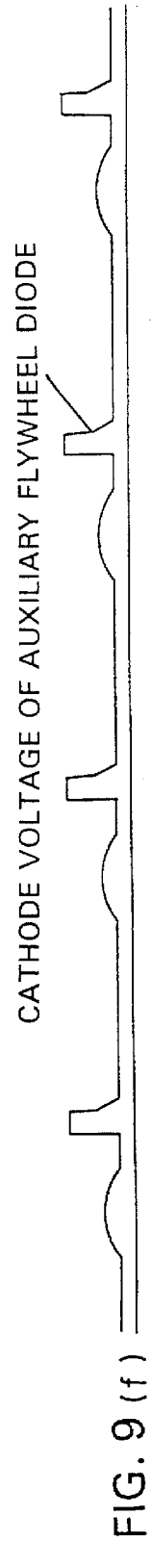

Further, when the load a of the main output power circuit 8 is light, the main output current I1 of the main output power circuit 8 decreases below the cut-off current value and the output voltage V2 of the auxiliary output power circuit 9 is about to drop sharply along a straight line A indicated by a solid line in FIG. 10, the series regulator 13 is put into the power-on state and the power starts to be fed to the voltage up capacitor 20, the second diode 22 and the series regulator 13 as shown in FIG. 9(e).

In this state, in the auxiliary output power circuit 9, the output of the output auxiliary coil 15 flows to the auxiliary choking coil L2, and also to the voltage up capacitor 20, the second diode 22 and the series regulator 13 as shown in FIG. 8 when the switching element 6 is ON. Then, the voltage up capacitor 20 is charged, the voltage at the input side of the auxiliary choking coil L2 is stepped up, and the choke current of the auxiliary choking coil L2 is prevented from reducing. A voltage Vs shown in FIG. 10, which is substantially equal to a voltage before the output voltage V2 drops sharply, is supplied to the load b. When the switching element 6 is OFF, the electromagnetic energy in the auxiliary choking coil L2 flows along the route via the load b, the first diode 21 and the voltage up capacitor 20.

According to the present embodiment, the series circuit in which the voltage up capacitor 20 is connected in series with the cathode side of the first diode 21 is connected in parallel with the flywheel diode D4. The voltage up capacitor 20 is connected to the input side of the auxiliary choking coil L2. The anode side of the second diode 22 is connected to the series connection point Y of the voltage up capacitor 20 and the first diode 21. The series regulator 13 is provided between the cathode side of the second diode 22 and the output side of the auxiliary choking coil L2. With this arrangement in the auxiliary output power circuit 9, when the load a connected to the main output power circuit 8 is light and the output voltage V2 of the auxiliary output power circuit 9 is about to drop sharply, the output of the output auxiliary coil 15 starts to flow also through the voltage up capacitor 20. Then, due to the voltage of the voltage up capacitor 20, the voltage at the input side of the auxiliary choking coil L2 is stepped up and the choke current is prevented from reducing. Thus, the auxiliary output power circuit 9 can output the constant output voltage V2 (Vs).

Further, because the output of the output auxiliary coil 15 passes through the series regulator 13, and part of the output of the output auxiliary coil 15 passes therethrough when the load a is light, and the voltage of the series regulator 13 is divided by the voltage up capacitor 20 only when the switching element 6 is ON, the power loss in the series regulator 13 may be suppressed as shown by the solid line D in FIG. 11.

Still more, because the second diode 22 is connected to the series regulator 13 in series, a backward current heading to the series regulator 13 from the output side of the auxiliary choking coil L2 may be blocked, thus protecting the series regulator 13. It also allows the use of a series regulator 13 whose withstand voltage against the backward current is small.

A second embodiment of an inventive multi-output switching power unit will be explained below with reference to FIG. 12. The present embodiment includes a practical embodiment of the series regulator 13 in the first embodiment of the multi-output switching power unit described above. It is noted that because the circuit structures of the input circuit 10 and the main output power circuit 8 are the same as those in the multi-output switching power unit of the first embodiment shown in FIG. 8, they are omitted in FIG. 12.

Figure 12:
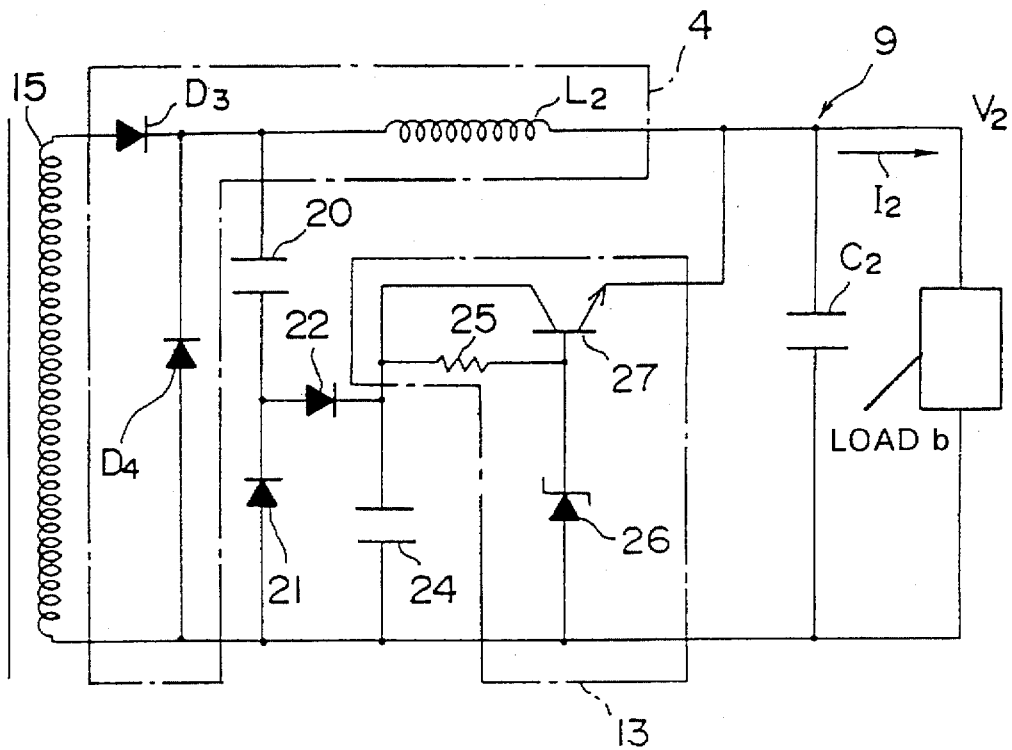
FIG. 12 is a circuit diagram showing a second embodiment of a multi-output switching power unit according to the invention.

As shown in FIG. 12, the series regulator 13 comprises a resistor 25, a transistor 27 and a Zener diode 26. A capacitor 24 is provided as in the preceding embodiment. The Zener diode 26 is selected so as to be turned on and to turn on the transistor 27 when the load a of the main output power circuit 8 is light and the output voltage V2 of the auxiliary output power circuit 9 drops below the preset voltage of the series regulator in the present embodiment. Thus, the series regulator 13 is put into the power-on state when, the Zener diode 26 and the transistor 27 are conductively connected.

When the series regulator 13 is in the power-on state, in the auxiliary output power circuit 9, the output of the output auxiliary coil 15 flows to the auxiliary choking coil L2 as well as the voltage up capacitor 20, the second diode 22 and the transistor 27 of the series regulator 13 when the switching element 6 is ON, charges the voltage up capacitor 20, steps up the voltage at the input side of the auxiliary choking coil L2, prevents the choke current from reducing and supplies the voltage Vs shown in FIG. 10 to the load b as described with respect to the first embodiment of the unit shown in FIG. 8. When the switching element 6 is OFF, the electromagnetic energy in the auxiliary choking coil L2 flows along the route of the load b, the first diode 21 and the voltage up capacitor 20. The present embodiment also obtains the same excellent effects as the first embodiment of the multi-output switching power unit described before.

A third embodiment of the multi-output switching power unit will be explained with reference to FIG. 13. A characteristic point of the present embodiment which differs from the first embodiment of the unit is that the series regulator 13 is connected to the anode side of the first diode 21 in series. It is noted that because the input circuit 10 and the main output power circuit 8 are the same as those in the first embodiment of the power unit, they are omitted in FIG. 13 and their explanation is also omitted. Similarly to the first embodiment of the power unit, the series regulator 13 is constructed so as to be put into the power-on state when the load a of the main output power circuit 8 is light and the output voltage V2 of the auxiliary output power circuit 9 drops below the preset reference voltage.

When the series regulator 13 is in the power-on state, while the output of the output auxiliary coil 15 flows through the auxiliary choking coil L2, it is also diverted just before the auxiliary choking coil L2 and flows to the voltage up capacitor 20 and the second diode 22 when the switching element 6 is ON. Then, similarly to the first embodiment of the power unit, the voltage up capacitor 20 is charged, the voltage at the input end side of the auxiliary choking coil L2 is stepped up, the choke current is prevented from reducing and the output voltage V2 of the auxiliary output power circuit 9 is prevented from dropping. When the switching element 6 is OFF, the electromagnetic energy in the auxiliary choking coil L2 flows through the route of the series regulator 13, the first diode 21 and the voltage up capacitor 20.

Figure 13:
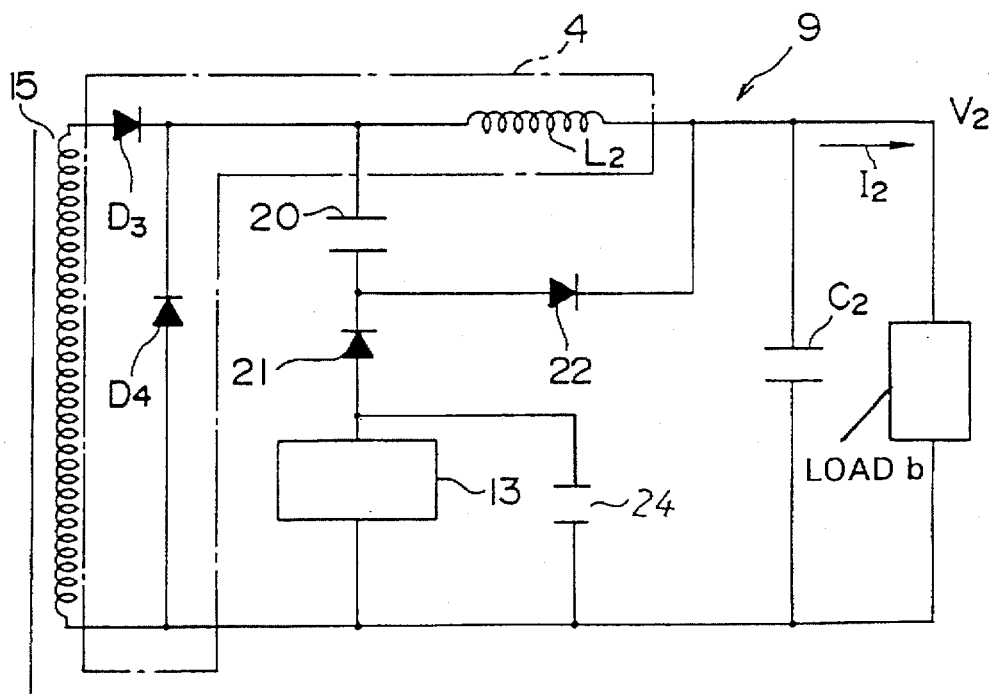
FIG. 13 is a circuit diagram showing a third embodiment of the multi-output switching power unit according to the invention.

In the circuit in FIG. 13, the charge in the voltage up capacitor 20 is discharged when the series regulator 13 is in the power-on state and when the switching element 6 is OFF. Due to that, while current can flow through the path of the voltage up capacitor 20 and the second diode 22 when the switching element 6 is turned ON, the charge in the voltage up capacitor 20 is not discharged when the series regulator 13 is in the power-off state. Accordingly, the voltage up capacitor 20 is kept in the charged-up state and the output of the output auxiliary coil 15 cannot flow through the voltage up capacitor 20. Accordingly, when the series regulator 13 is in the power-off state, i.e. when the load of the main output power circuit 8 is not light, the entire output of the output auxiliary coil 15 is supplied to the load b via the path of the rectifier diode D3 and the auxiliary choking coil L2 when the switching element 6 is ON.

The third embodiment can provide the excellent effects similarly to the first embodiment of the power unit by connecting the series regulator 13 at the anode side of the first diode 21.

It is noted that the present invention is not confined only to the embodiments described above. Rather, it can be embodied in various ways. For example, the circuit structure of the series regulator 13 is not confined only to the concrete example shown in FIG. 12. It may be configured so that it is put into the power-on state and the output of the output auxiliary coil 15 is diverted and flows also through the route which passes through the voltage up capacitor 20 when the load a of the main output power circuit 8 is light and the output voltage V2 of the auxiliary output power circuit 9 drops below the preset reference voltage.

Further, although the switching element 6 has been formed by a MOS-FET in each embodiment described above, other switching elements such as a transistor may be used. The ON/OFF switching of the switching element is controlled similarly to the switching described above also in such a case in order to stabilize the main output voltage V1.

Figure 14:
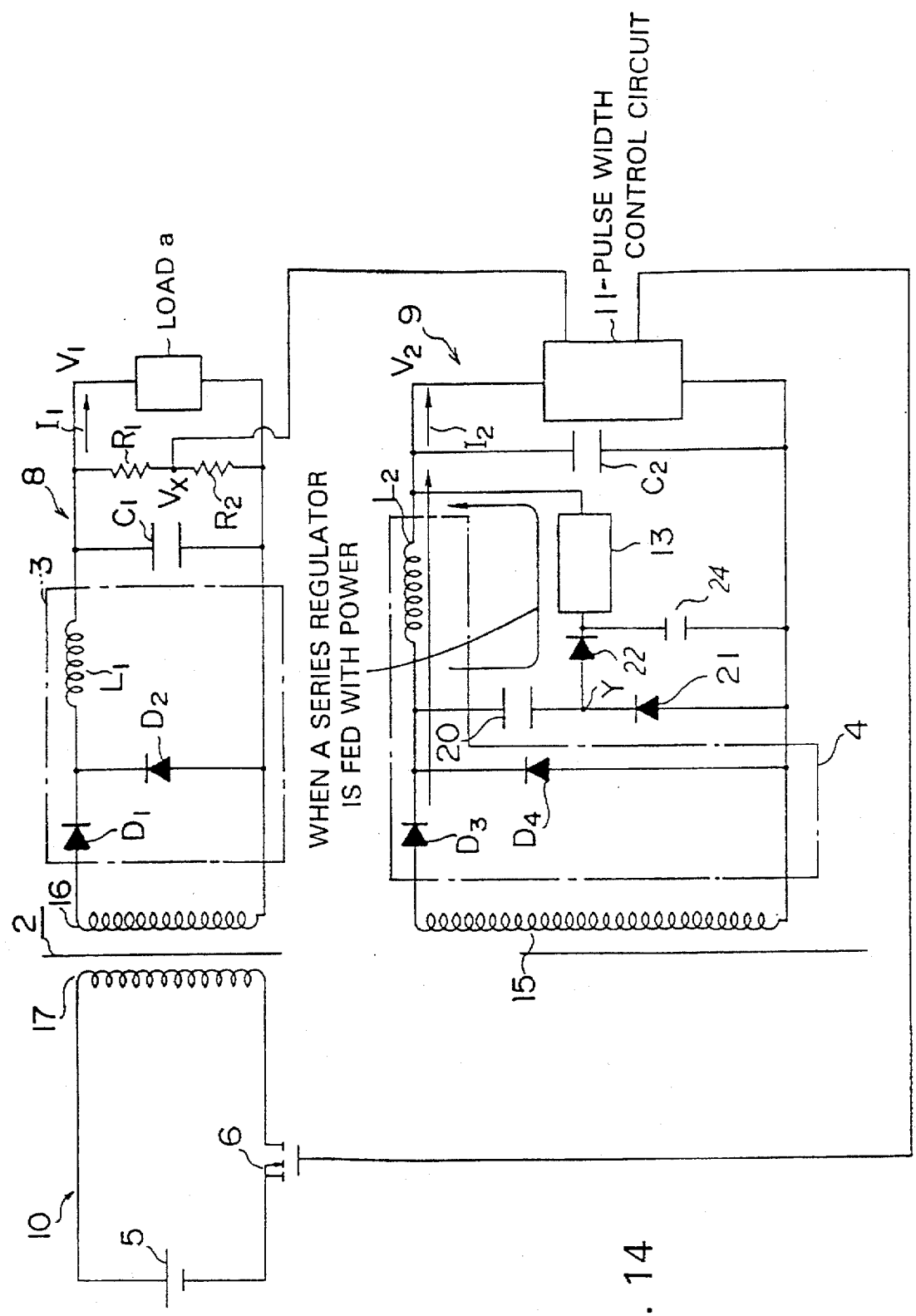
FIG. 14 is a circuit diagram showing another embodiment of a multi-output switching power unit.

The regulator circuit (the auxiliary output power circuit) shown in each embodiment described above may also be used as a power supply of various control ICs, such as the pulse width control circuit 11 as shown in FIG. 14 for example.

Although the second diode 22 is connected in series to the series regulator 13 for blocking the backward current in the embodiments shown in FIGS. 1, 4, 8 and 12, the second diode 22 may be omitted when the withstand voltage of the series regulator 13 is large. The capacitor 24 for converting the current flowing in the series regulator to a direct current may be also omitted.

Although the second diode 22 has been connected to the input side of the series regulator 13 in the first and second embodiments of the multi-output switching power unit described above, the second diode 22 may alternatively be connected in series to the output side of the series regulator 13 by connecting the cathode side of the second diode 22 to the output side of the auxiliary choking coil L2. The backward current may be blocked also by that arrangement, similarly to the first and second embodiments of the power unit.

It is noted that although only one auxiliary output power circuit 9 has been shown in each embodiment of the multi-output switching power unit described above, two or more circuits may be provided as necessary.

Figure 17:
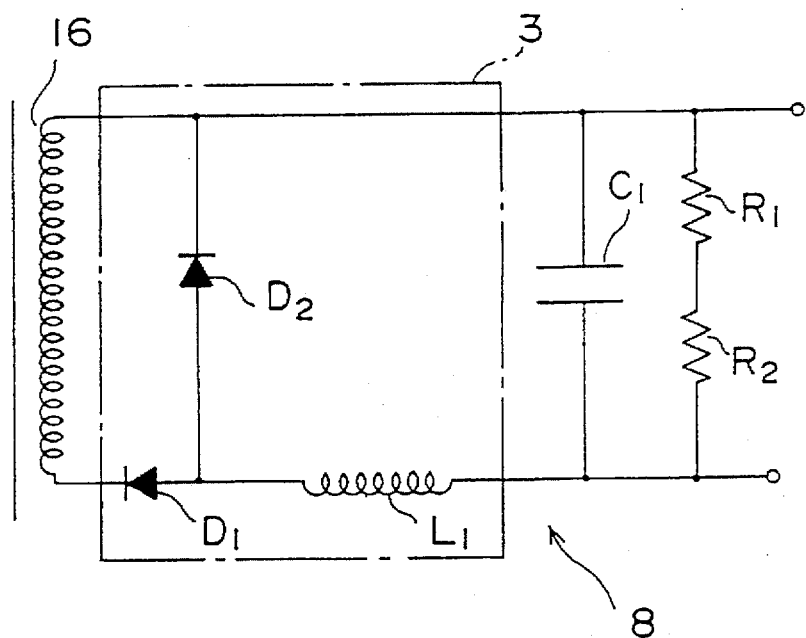
FIG. 17 is a circuit diagram showing a prior art choke rectifier circuit.

When the choke rectifier circuit 3 of the main output power circuit 8 is constructed as shown in FIG. 17, the excellent effects of each of the above embodiments of the power unit may be obtained by providing the voltage up capacitor 20, the first diode 21 and the series regulator 13, and the second diode 22 as necessary, in the auxiliary output power circuit 9 similarly to each of the above embodiments of the power unit.

Figure 18A:
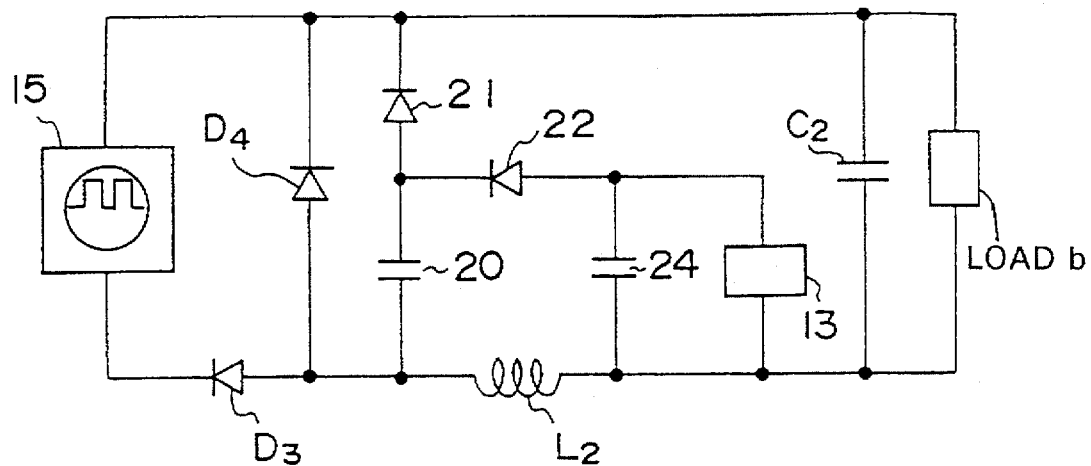
FIG. 18(a) and FIG. 18(b) are circuit diagrams showing other embodiments of a regulator circuit.
Figure 18B:
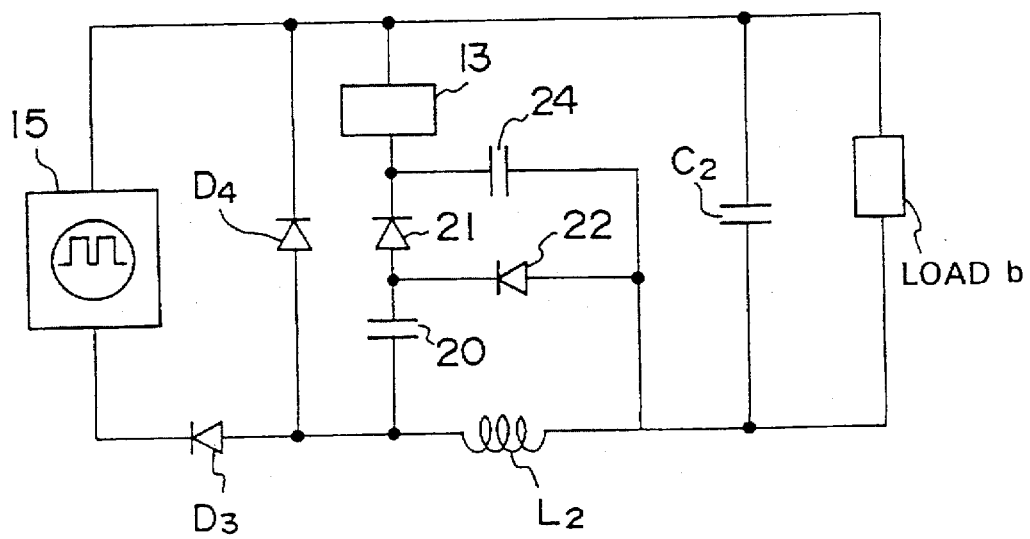

More precisely, as shown in FIG. 18(a) and 18(b), there may be provided a circuit comprising a rectifier diode D3, a flywheel diode D4, a first diode 21, a voltage up capacitor 20, a second diode 22, a series regulator 13, and a capacitor 24. In FIG. 18(a), a rectifier circuit including the rectifier diode D3 and the flywheel diode D4 is connected in parallel to an inverter 15, and a choking coil L2 is connected to an output end of the negative side of the rectifier circuit. Further, flywheel diode D4 is connected in parallel with a series circuit of the voltage up capacitor 20 connected in series to the anode side of the first diode 21. Also, a cathode side of a second diode 22 is connected to the series connection point of the first diode 21 and the voltage up capacitor 20. An input side of the series regulator is connected to an anode side of the second diode 22. An output side of the series regulator is connected to an output side of a choking coil L2. Further, a capacitor 24 for converting the current flowing in the series regulator 13 to a direct current is connected between the anode side of the second diode 22 and the output side of the choking coil L2.

In FIG. 18(b), a rectifier circuit including the rectifier diode D3 and the flywheel diode D4 is connected in parallel to the inverter 15, and the choking coil L2 is connected to the output end of the negative side of the rectifier circuit. Further, there is provided a series connected circuit wherein the voltage up capacitor 20 is series connected to the anode side of the first diode 21 and wherein the series regulator is series connected to the cathode side of the first diode 21. This series connected circuit is connected in parallel with the flywheel diode D4 by connecting the voltage up capacitor of the series connected circuit to the input side of the choking coil L2. Also, the cathode side of the second diode 22 is connected to the series connection point of the first diode 21 and the voltage up capacitor 20, and the anode side of the second diode 22 is connected to the output side of the choking coil L2. Further, the capacitor 24 for converting the current flowing in the series regulator 13 to a direct current is connected between the series connection point of the series regulator 13 and the first diode 21 and the output side of the choking coil L2.

Still more, while the multi-output switching power unit of each embodiment has been exemplified by a forward type power unit, the present invention may be applied also to another type of multi-output switching power unit using the choke input rectification.

Further, although the stabilization control of the output voltage of the main output power circuit 8 of the multi-output switching power unit has been performed by pulse width control, by means of the pulse width control circuit, it may be performed by other control methods such as a frequency control method.

As described above, according to the inventive regulator circuit, when an output voltage drops lower than the predetermined voltage of the series regulator, the series regulator is conductively connected, the rectified current of the AC input is divided between the choking coil and the voltage up capacitor, and a voltage at the input side of the choking coil is stepped up as the voltage up capacitor is charged by the current flowing through the voltage up capacitor. Because the voltage at the input side of the choking coil is stepped up by the voltage up capacitor, the current flowing through the choking coil increases, thus preventing the current flowing through the choking coil from becoming discontinuous, and reducing the current flowing through the series regulator as a result of the increase of the current flowing through the choking coil. Further, the voltage applied to the series regulator may be reduced by the voltage dividing effect caused by the voltage up capacitor 20. As a result, excellent effects are brought about, namely that the loss in the circuit operation may be reduced, the drop of the output voltage may be suppressed and the voltage may be supplied stably.

Further, because the regulator having the excellent characteristics described above is adopted as the auxiliary output power circuit in the inventive multi-output switching power unit, the series regulator is put into the conductively connected state when the main output power circuit is lightly-loaded and the output voltage of the auxiliary output power circuit drops lower than the predetermined voltage of the series regulator. Then, the output of the output auxiliary coil flows to the auxiliary choking coil as well as to the circuit passing through the voltage up capacitor, charges the voltage up capacitor, steps up the voltage at the input end side of the auxiliary choking coil and prevents the choke current from being cut off. Thus, it becomes possible to prevent the output voltage of the auxiliary output power circuit from dropping when the main output power circuit is lightly-loaded.

Further, in the inventive regulator and the multi-output switching power unit, the series regulator may be protected by connecting the second diode in series with the series regulator for blocking backward current, thus allowing a series regulator having a small withstand voltage against the backward current to be used.

While preferred embodiments have been described, variations thereto will occur to those skilled in the art within the scope of the present inventive concepts.

What is claimed is:

1. A regulator circuit comprising:

an input section for receiving an AC signal;

a rectifier circuit connected with said input section, for rectifying the AC signal input to said input section;

a choking coil connected in series with an output of said rectifier circuit;

a series circuit of a first diode and a voltage up capacitor connected to the output of said rectifier circuit with said voltage up capacitor connected to an input side of said choking coil; and a series regulator connected between a series connection point of said first diode and said voltage up capacitor and an output side of said choking coil.

2. The regulator circuit according to claim 1, further comprising a second diode connected in series with said series regulator for blocking a backward current.

3. A regulator circuit comprising:

an input section for receiving an AC signal;

a rectifier circuit connected with said input section, for rectifying the AC signal input to said input section;

a choking coil connected in series with an output of said rectifier circuit;

a series circuit of a first diode and a voltage up capacitor connected to the output of said rectifier circuit with said voltage up capacitor connected to an input side of said choking coil;

a series regulator connected in series with said first diode; and a second diode connected between said voltage up capacitor and the output side of said choking coil for blocking a backward current.

4. A multi-output switching power unit, comprising:

an input power supply and a switching element, provided at the input side of a transformer for controlling an output at a secondary side of said transformer;

a main rectifier circuit connected with a main output coil on said secondary side of said transformer;

a main choking coil connected in series with an output of said main rectifier circuit, thus forming a main output power circuit at the secondary side of said transformer;

an output auxiliary coil which is provided at the secondary side of said transformer; and a regulator circuit connected to said output auxiliary coil, said regulator circuit comprising:

an input section for receiving an AC signal from said output auxiliary coil;

a rectifier circuit connected with said input section, for rectifying the AC signal input to said input section;

a choking coil connected in series with an output of said rectifier circuit;

a series circuit of a first diode and a voltage up capacitor connected to the output of said rectifier circuit with said voltage up capacitor connected to an input side of said choking coil; and a series regulator connected between a series connection point of said first diode and said voltage up capacitor and an output side of said choking coil.

5. The power unit according to claim 4, further comprising a second diode connected in series with said series regulator for blocking a backward current.

6. A multi-output switching power unit, comprising:

an input power supply and a switching element, provided at the input side of a transformer for controlling an output at a secondary side of said transformer;

a main rectifier circuit connected with a main output coil on said secondary side of said transformer;

a main choking coil connected in series with an output of said main rectifier circuit, thus forming a main output power circuit at the secondary side of said transformer;

an output auxiliary coil which is provided at the secondary side of said transformer; and a regulator circuit connected to said output auxiliary coil, said regulator circuit comprising:

an input section for receiving an AC signal from said output auxiliary coil;

a rectifier circuit connected with said input section, for rectifying the AC signal input to said input section;

a choking coil connected in series with an output of said rectifier circuit;

a series circuit of a first diode and a voltage up capacitor connected to the output of said rectifier circuit with said voltage up capacitor connected to an input side of said choking coil;

a series regulator connected in series with said first diode; and a second diode connected between said voltage up capacitor and the output side of said choking coil for blocking a backward current.

* * * * *